J. J. WOOD.
TALKING MACHINE.
APPLICATION FILED DEC. 19, 1917.

1,304,234.

Patented May 20, 1919.
2 SHEETS—SHEET 1.

Inventor:
James J. Wood,
by Albert G. Davis
His Attorney.

J. J. WOOD.
TALKING MACHINE.
APPLICATION FILED DEC. 19, 1917.

1,304,234.

Patented May 20, 1919.
2 SHEETS—SHEET 2.

Inventor:
James J. Wood,
by Albert G. Davis
His Attorney.

UNITED STATES PATENT OFFICE.

JAMES J. WOOD, OF FORT WAYNE, INDIANA, ASSIGNOR TO GENERAL ELECTRIC COMPANY, A CORPORATION OF NEW YORK.

TALKING-MACHINE.

1,304,234.  Specification of Letters Patent.  Patented May 20, 1919.

Original application filed May 6, 1915, Serial No. 26,278. Divided and this application filed December 19, 1917. Serial No. 207,828.

*To all whom it may concern:*

Be it known that I, JAMES J. WOOD, a citizen of the United States, residing at Fort Wayne, county of Allen, State of Indiana, have invented certain new and useful Improvements in Talking-Machines, of which the following is a specification.

My invention relates to talking machines or similar apparatus and is particularly applicable to talking machines of the disk type. It has for its object to provide a novel form of drive for such machines. My invention comprises a novel and simple apparatus, in which, first, the motor is directly connected to the record carrying plate and drives the plate with constant angular velocity and, second, the speed of the motor is easily controlled.

My present application is a division of my prior application, Ser. No. 26,278, filed May 6, 1915.

Figure 1:
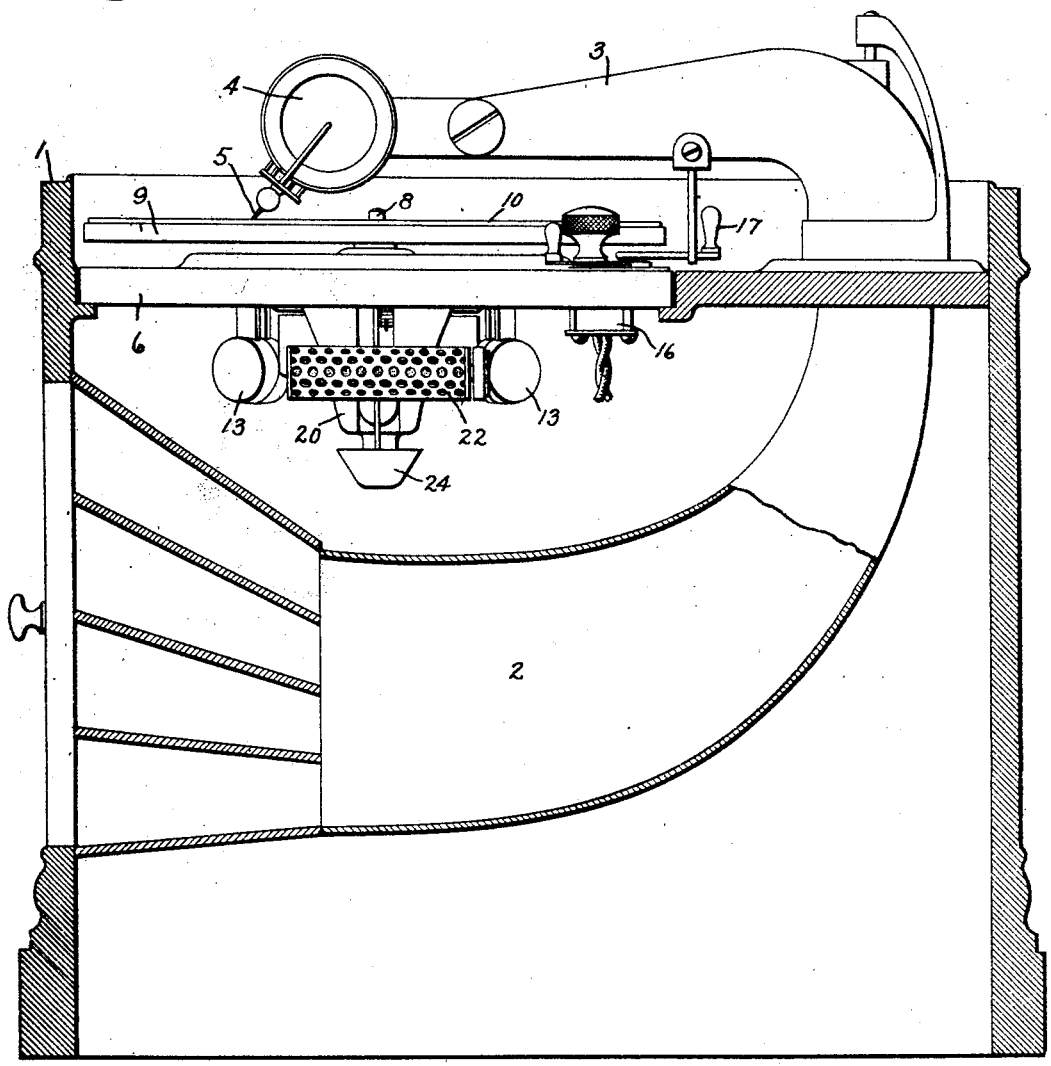
Figure 2:
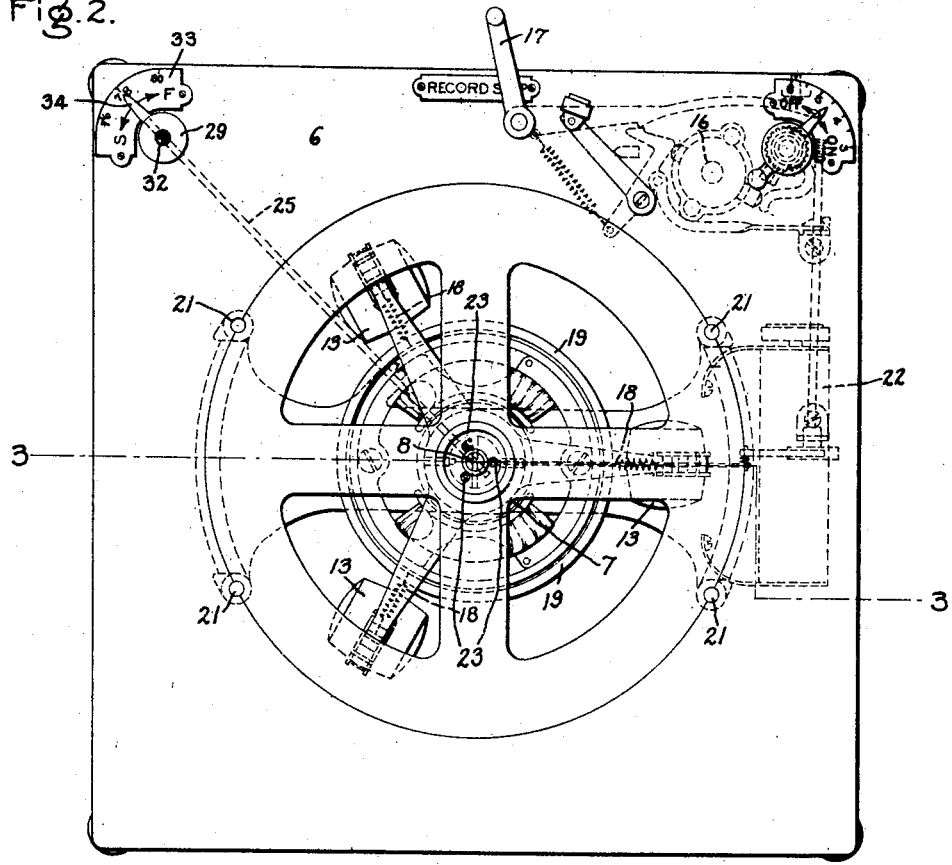
Figure 3:
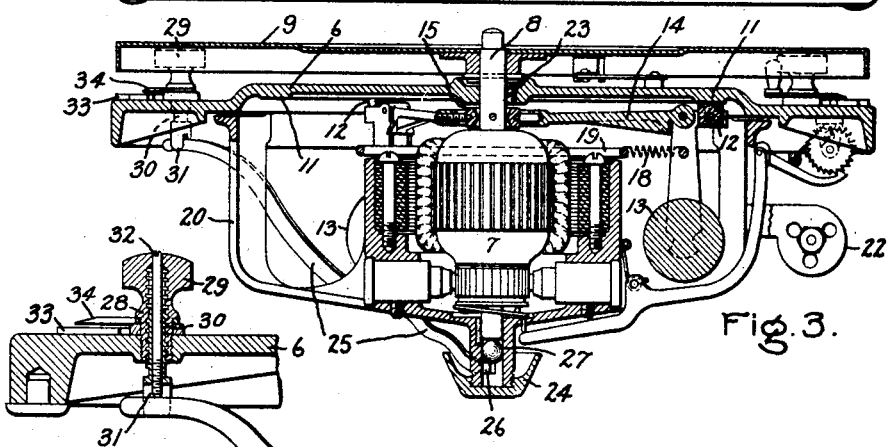
Figure 4:
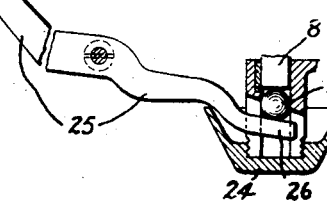

The various features of novelty, which characterize my invention, are pointed out in the claims annexed to and forming part of this specification. For a better understanding of my invention reference may be had to the following description, taken in connection with the accompanying drawings, in which Figure 1 is a sectional view of a talking machine embodying my invention; Fig. 2 is a plan view of my motor drive; Fig. 3 is a sectional view taken on the line 3—3 of Fig. 2; and Fig. 4 is an enlarged view of the speed controlling mechanism.

In Fig. 1 of the drawings, I have shown my invention applied to a talking machine of the disk type having a cabinet 1, a horn 2, and a sound box arm 3 on which is mounted a sound box 4. The sound box carries a stylus 5. A motor plate 6 is mounted in the cabinet. These parts may be of any usual or well-known construction.

Supported from the motor plate 6 is a motor 7 having a vertical shaft 8. The motor 7 is preferably an electric motor. A record carrying plate 9 is mounted on the shaft of the motor and carries a record 10, the grooves on which are engaged by the stylus 5. The speed and angular velocity of the motor are maintained constant by means of a centrifugal governor of novel design and mounting which comprises two coöperating members, one of which is preferably mounted on a universal joint for reasons which will be hereinafter set forth. One of these members is a track 11 which is shown as being formed on the under side of the motor plate. The other member comprises felt friction pads 12, weights 13 for moving the pads into more or less close engagement with the track 11, and a member 14 to which the weights are pivoted and which is shown as being mounted on a universal joint 15 on the motor shaft. By thus mounting one member of the governor on a universal joint, the pressure of the friction pads on the track may be maintained constant, even though the shaft of the motor is tilted so as to be at an angle to the vertical, the pressure also being maintained constant even though there are slight irregularities in the track. The speed of the motor is varied by means of a novel mechanism which operates to raise or lower the shaft of the motor and thus change the pressure of the friction pads 12 on the track 11. The current to the motor is turned on and off by means of a switch 16 of ordinary construction which may be operated into the on and off positions manually, and when in the on position, it may also be operated into the off position by means of a record stop 17, or after a definite number of revolutions of the motor by means of a novel mechanism shown and described in the parent application.

The friction pads 12 are pivoted to the governor weights 13, which are retarded by springs 18 connected to an equalizing member 19, shown in the form of a ring. The springs and equalizing member together with the universal joint support for the weights, give an absolutely uniform pressure on the friction pads, thereby producing constant angular velocity under all conditions of operation. The universal joint in the arrangement shown comprises gimbals mounted at right angles to each other.

The electric motor 7 is suspended from the motor plate 6 by means of a bracket 20 fastened thereto by screws 21. The motor is shown as a commutator motor of the series type, which can be operated on the commercial ranges of voltage of alternating current circuits and by the insertion of a resistance 22 in series with the motor can be operated on the same ranges of voltage of direct current circuits, the speed at different commercial frequencies and voltages being practically constant. In order to reduce vibration to a minimum and keep the bearings of the motor in the bracket 20 properly lubricated for a considerable period of time, they are fitted with felt rubbers 23 set 120 degrees apart. These rubbers 23 take up automatically any looseness that may be in the bearings tending to produce noise due to excessive vibration. A little oil basin 24 is provided at the bottom of the bracket 20 to catch any drip that may occur.

The shaft 8 of the motor is raised or lowered to vary the speed of the motor by means of a lever 25 which is operatively connected to the end of the motor shaft. This lever is rocked on its pivot by a compound screw which engages one end of the lever 25 and which when turned in one direction, lowers the bearing and increases the speed, and when turned in the opposite direction raises the bearing to decrease the speed. The lever 25 is pivoted to the bracket 20. Between the end 26 of the lever and the shaft 8 is a ball 27 which acts as a ball thrust bearing therefor. The compound screw is constructed of three concentric parts one within the other. The first is a fine threaded screw 28 for causing a small motion in the direction of its axis when a knob 29, formed integrally therewith, is turned to the right or left. The second is a coarse threaded screw 30 which has a forked end 31 into which the lever 25 is fitted and which prevents the screw 30 from turning. This screw 30 travels rapidly for a slight motion of the knob 29 and presses on the end of the lever 25 to rock it on its pivot through the agency of the third screw, which is another fine threaded screw 32 of small diameter threaded into the coarse threaded screw and fitting loosely within the knob 29. This fine threaded screw 32 is used to adjust the position of the lever 25 with reference to the knob 29 so as to give the lever its initial adjustment. The motor plate 6 is provided with a dial 33 on which are marked certain speeds such as 76, 78 and 80 revolutions per minute. By moving the fine threaded screw, the lever 25 may be adjusted so as to give the exact speed marked on the dial 33 and to which a pointer 34, carried by the knob 29, points. After the initial adjustment has been made, the turning of the pointer 34 to any of the other speeds indicated on the dial will give the speed of the motor in accordance with that indicated on the dial.

I desire it to be understood that my invention is applicable to any talking machine or similar apparatus and is not limited to the particular arrangement shown and described and I aim in the appended claims to cover all modifications which do not depart from the spirit and scope of my invention.

What I claim as new and desire to secure by Letters Patent of the United States is:—

1. In a talking machine a motor plate, a motor supported from said plate and having a vertical shaft, a record carrying plate mounted on said shaft and a centrifugal governor for said motor comprising a track, friction pads for engaging said track, weights for moving said pads into more or less close engagement with said track, and means for mounting said weights on said shaft comprising a member to which said weights are pivoted and a universal joint between said member and said shaft.

2. In a talking machine, a motor plate, a motor supported from said plate and having a vertical shaft, a record carrying plate mounted on said shaft, and a centrifugal governor for said motor comprising a track, friction pads for engaging said track, weights for moving said pads into more or less close engagement with said track, means for mounting said weights on said shaft comprising a member to which said weights are pivoted and a universal joint between said member and said shaft, springs, and equalizing means engaging the ends of each of said springs, the other end of each of said springs engaging each of said weights.

3. In a talking machine, a motor plate, a motor mounted on said plate having a vertical shaft, a record carrying plate mounted on said shaft, and a centrifugal governor for said motor comprising a track, friction pads for engaging said track, weights to which said friction pads are pivoted, a member to which said weights are pivoted, and a universal joint between said member and said shaft.

4. In a talking machine, a motor plate, a motor mounted on said plate having a vertical shaft, a record carrying plate mounted on said shaft, and a centrifugal governor for said motor comprising a track, friction pads for engaging said track, weights to which said friction pads are pivoted, a member to which said weights are pivoted, a universal joint between said member and said shaft, springs, and equalizing means said shaft, springs, and equalizing means engaging the ends of each of said springs, the other end of each of said springs engaging each of said weights.

In witness whereof I have hereunto set my hand this 14th day of December, 1917.

JAMES J. WOOD.